United States Patent
Kaneko (10) Patent No.: US 7,374,101 B2
(45) Date of Patent: May 20, 2008

(54) ADAPTER PANEL, ELECTRONIC EQUIPMENT, AND CABLE CONNECTOR IDENTIFICATION SYSTEM

(75) Inventor: Toshiyuki Kaneko, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 541 days.

(21) Appl. No.: 11/059,528

(22) Filed: Feb. 17, 2005

(65) Prior Publication Data

US 2005/0215119 A1     Sep. 29, 2005

(30) Foreign Application Priority Data

Feb. 20, 2004     (JP) .............................. 2004-044150

(51) Int. Cl.
  *G06K 19/06*     (2006.01)
(52) U.S. Cl. ..................................... 235/492
(58) Field of Classification Search ................ 235/439, 235/451, 492; 439/607, 188
See application file for complete search history.

(56) References Cited

U.S. PATENT DOCUMENTS 6,226,529 B1 *  5/2001  Bruno et al. ................. 455/557
6,840,448 B2 *  1/2005  Fukushima et al. ......... 235/451
6,971,895 B2 * 12/2005  Sago et al. .................. 439/188

FOREIGN PATENT DOCUMENTS

JP     2003229215 A  *  8/2003

* cited by examiner

*Primary Examiner*—Seung Ho Lee
*Assistant Examiner*—April A. Taylor
(74) *Attorney, Agent, or Firm*—Birch, Stewart, Kolasch & Birch, LLP (57)     ABSTRACT

An adapter panel has an adapter where a connector including a wireless IC tag in a side surface is inserted or removed. The adapter panel includes a booster antenna placed in a position facing the wireless IC tag of the adapter when the connector is inserted to the adapter, and an equipment antenna placed in a surface of the adapter panel which is a reverse side of the surface where the connector is inserted or removed in a position corresponding to the booster antenna. The adapter panel is applicable to electronic equipment and a cable connector identification system.

9 Claims, 11 Drawing Sheets

PRIOR ART

Fig. 13

PRIOR ART

Fig. 14

ADAPTER PANEL, ELECTRONIC EQUIPMENT, AND CABLE CONNECTOR IDENTIFICATION SYSTEM

BACKGROUND OF THE INVENTION

1. Field of the Invention

The present invention relates to adapter panels, electronic equipment, and cable connector identification systems, and particularly to an adapter panel where a cable with a connector having an IC device is inserted and removed, electronic equipment having the adapter panel, and a cable connector identification system identifying the connector of the cable.

2. Description of Related Art

Various electrical equipment input or output information by a cable. For example, an oscilloscope has a connector jack to connect a removable cable integral with a connector, thereby inputting waveform information.

If such a conventional oscilloscope measures the waveform with a relatively high frequency wave, the measurement waveform fluctuates due to fluctuation in the impedance of a probe, which may result in inaccurate measurement. Further, the electrical equipment where a plurality of plugs are inserted or removed such as a telephone switching device is subject to insertion mistake.

Japanese Unexamined Patent Application Publication No. 2003-229215 (Nakagawa et. al.) describes a cable connector identification system to overcome the above problems. This cable connector identification system attaches a wireless IC tag to a connector of a cable that is connected to electrical equipment. This cable connector identification system allows correction of fluctuation in the measurement waveform of an oscilloscope and detection whether a correct cable is inserted or not by reading various information stored in the wireless IC tag.

Figure 13:
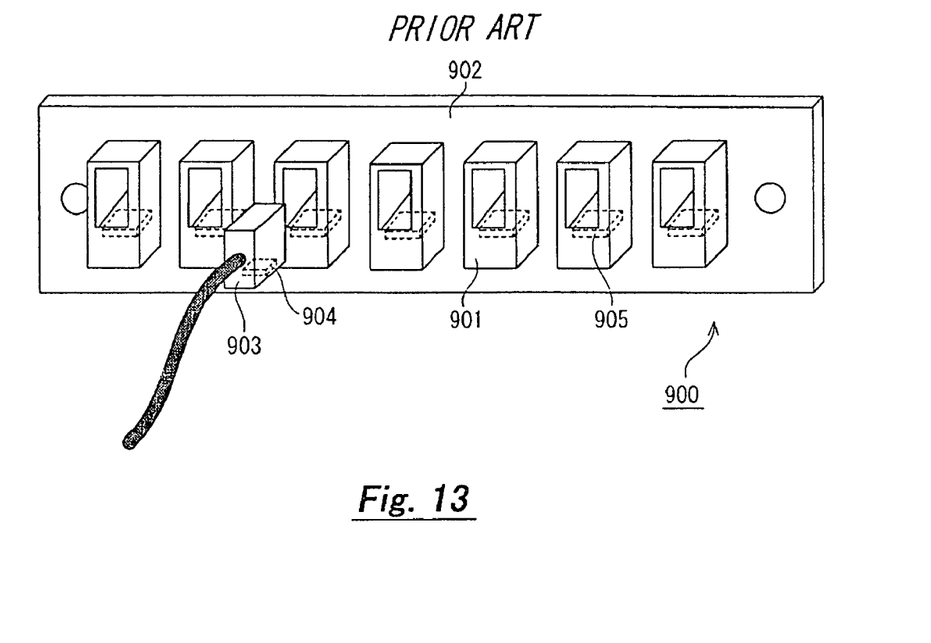
FIG. 13 is a perspective view illustrating an optical cable socket base in a conventional circuit switching device.

Nakagawa et. al. teaches a case of applying this cable connector identification system to a circuit switching device. In this case, an optical cable is inserted to an adapter panel and the adapter panel is mounted to the circuit switching device. This adapter panel is described below with reference to FIGS. 13 and 14. FIG. 13 is a diagrammatic perspective view showing a structural example of the adapter panel. The adapter panel 900 in FIG. 13 has an adapter 901, an attachment 902, a connector housing 903, a Coil-on-Chip Radio Frequency Identification (RFID) 904, and a reader/writer (R/W) antenna 905.

The adapter panel 900, the adapter 901, the attachment 902, and the connector housing 903 respectively correspond to the optical cable socket base 410, the relay socket 411, the relay socket attachment 413, and the optical cable connector 10 in the above related art.

As illustrated in FIG. 13, a plurality of adapters 901 are arranged on the adapter panel 900, and the connector housing 903 is inserted to each adapter 901. The adapters 901 are fixed to the attachment 902. The connector housing 903 is mounted to the adapter panel 900 by the attachment 902. Further, the Coil-on-Chip RFID 904 is attached to placed in the connector housing 903. The R/W antenna 905 is placed in the adapter 901 to wirelessly communicates with the Coil-on-Chip RFID 904.

Figure 14:
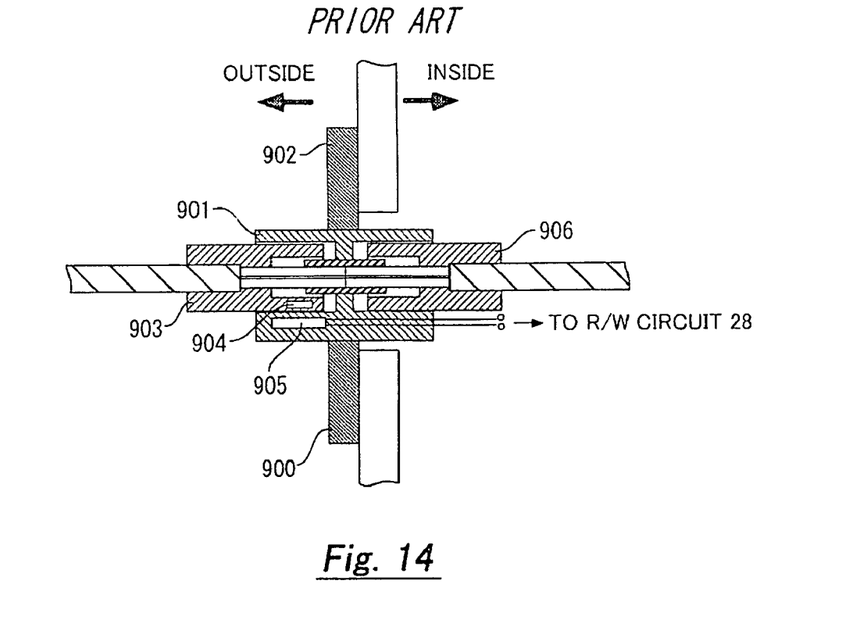
FIG. 14 is a cross-sectional view illustrating an example of the connection structure of an optical cable in a conventional circuit switching device.

FIG. 14 is a cross-sectional view showing an example of the connection structure of an optical cable. This cross-sectional view illustrates the connector housing 903 in the operating side being inserted to the adapter 901.

As shown in FIG. 14, the adapter 901 is mounted to the adapter panel 900 as penetrating between the outside (operating side) and the inside (equipment side) of a case. The connector housings 903 and 906 are inserted to the adapter 901 from the operating side and the equipment side, respectively, thereby allowing optical communication between both optical cables in the operating and equipment sides.

The Coil-on-Chip RFID 904 is placed in the lower side part of the connector housing 903 in the operating side. The R/W antenna 905 is embedded in the lower side part of the adapter 901 projecting from the equipment. The Coil-on-Chip RFID 904 is placed in the position to face the R/W antenna 905 when the connector housing 903 is inserted to the adapter 901. In this position, the R/W antenna 905 wirelessly communicates with the Coil-on-Chip RFID 904. The R/W antenna 905 is connected to a reader/writer (R/W) circuit, not shown, to output the data input from the Coil-on-Chip RFID 904 to the R/W circuit.

The R/W circuit is placed inside the equipment. On the other hand, the R/W antenna 905 is placed in the adapter 901 which projects from the circuit switching device. Thus, it is necessary to place the R/W circuit in the equipment side that is the inner than the adapter panel 900 and draw a connection line between the R/W antenna 905 and the R/W circuit from the inside of the adapter panel 900 to the outside thereof. In this case, a printed circuit board is produced by using a substrate in which a place to form the R/W antenna 905 projects. The printed circuit board with such a special shape is difficult to form and causes low yield.

Further, in this printed circuit board, the R/W circuit is placed inside the equipment, and the R/W antenna 905 is mounted to the adapter panel 900 as drawn to the outside of the adapter panel 900. Thus, it is required to make a slit in the attachment 902 to allow the R/W antenna 905 to pass through. Since the adapter panel 900 is assembled by inserting the R/W antenna 905 to the slit of the attachment 902, it impedes efficient assembly of the adapter panel 900.

As described above, a conventional adapter panel is not easy to manufacture and assemble, which results in high manufacturing costs.

SUMMARY OF THE INVENTION

In view of the foregoing, it is an object of the present invention to provide a low-cost adapter panel, electronic equipment, and cable connector identification system.

To these ends, according to one aspect of the present invention, there is provided an adapter panel having an adapter where a connector including a wireless IC tag in a side surface is inserted or removed. The adapter panel includes a booster antenna placed in a position facing the wireless IC tag of the adapter when the connector is inserted to the adapter, and an equipment antenna placed in a surface of the adapter panel which is a reverse side of the surface where the connector is inserted or removed in a position corresponding to the booster antenna. This configuration allows placing the equipment antenna in a desired position, thereby providing a low-cost adapter panel.

In the above adapter panel, the booster antenna may be placed substantially perpendicular to the equipment antenna. This ensures suitable wireless communication between the booster antenna and the equipment antenna.

The above adapter panel may have a first surface where the connector is inserted or removed, and a second surface which is a reverse side of the first surface. The adapter may be placed in the first surface, and the equipment antenna may be placed in the second surface. This allows forming the equipment antenna by patterning on the second surface, which further reduces the manufacturing cost of the adapter panel.

The above adapter panel may further comprise an attachment to which the adapter is attached and which mounts the adapter to the adapter panel, wherein the attachment sets a position of the adapter. This allows reliably fixing the position of the adapter, which provides more reliable wireless communication between the booster antenna and the equipment antenna.

According to another aspect of the present invention, there is provided an adapter panel having a plurality of adapters where a connector including a wireless IC tag in a side surface is inserted or removed and including a first surface where the connector is inserted or removed and a second surface which is a reverse side of the first surface. The adapter panel includes a booster antenna placed in a side surface of the adapter in a position facing the wireless IC tag when the connector is inserted to the adapter, and an equipment antenna placed in the second surface of the adapter panel in a position corresponding to the booster antenna. This configuration allows placing the equipment antenna in a desired position, thereby providing a low-cost adapter panel.

According to still another aspect of the present invention, there is provided electronic equipment including an adapter panel having in an outer side an adapter where a connector including a wireless IC tag in a side surface is inserted or removed, a booster antenna placed in a position facing the wireless IC tag when the connector is inserted to the adapter, and an equipment antenna placed inside the electronic equipment. The booster antenna relays wireless communication between the wireless ID tag and the equipment antenna. This configuration allows placing the equipment antenna in a desired position, thereby providing a low-cost adapter panel.

According to yet another aspect of the present invention, there is provided a cable connector identification system including a cable having a connector, equipment connected to the cable via the connector, and the above adapter panel. This configuration reduces the manufacturing cost of the adapter panel, which allows low-cost manufacture of the cable connector identification system.

In the above cable connector identification system, a plurality of adapters may be arranged on the adapter panel in a matrix form. With this structure, even if the plurality of adapters are arranged close to each other in a matrix form, the wireless IC tag can communicate with the equipment antenna via the booster antenna without fail.

In the above cable connector identification system, the cable is preferably an optical fiber cable. Since the optical fiber cable requires a higher positioning accuracy, it is possible to place the wireless IC tag accurately. This allows suitable communication between the wireless IC tag and the booster antenna.

The present invention can thereby provide a low-cost adapter panel, electronic equipment, and cable connector identification system.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

In a cable connector identification system of the present invention, the communication between a Coil-on-Chip RFID placed in a connector of a cable and a R/W antenna electrically connected to a R/W circuit is relayed by a booster antenna that faces the Coil-on-Chip RFID when the cable is inserted.

Preferred embodiments of the present invention are described hereinafter with reference to the drawings.

First Embodiment

Figure 1A:
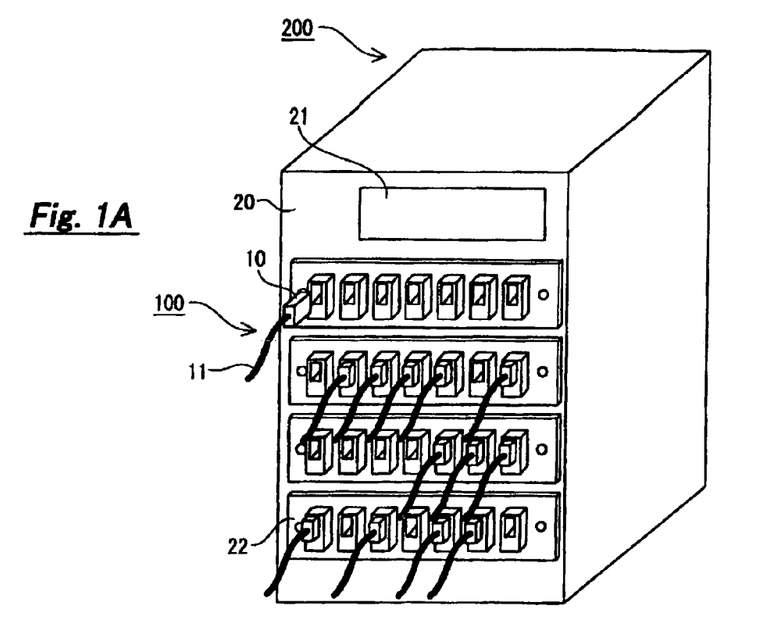
FIGS. 1A and 1B are views illustrating an example of the cable connector identification system of this invention.

A first embodiment of the invention applies a cable connector identification system to a circuit switching device, which is also referred to hereinafter as a telephone switching device. The circuit switching device is unique in the specific structure. FIG. 1A illustrates the entire configuration of the cable connector identification system. The cable connector identification system is composed of an optical fiber cable 100 and a circuit switching device 200.

The optical fiber cable 100 has an optical fiber connector 10 and an optical fiber code 11. The optical fiber cable 100, the optical fiber connector 10, and the optical fiber code 11 are abbreviated hereinafter as the optical cable 100, the optical connector 10, and the optical code 11, respectively.

The optical connector 10 is a male plug made of insulating material such as plastic, synthetic resin, and rubber. The optical code 11 has an optical fiber inside, though not shown. The other end of the optical code 11, which is not shown, has an optical connector of the same shape as the optical connector 10.

The circuit switching device 200 has a display section 21 and a plurality of adapter panels 22 on one side surface of a main body panel 20. The cable connector identification system of the first embodiment is used by connecting the optical cable 100 to the circuit switching device 200.

Figure 1B:
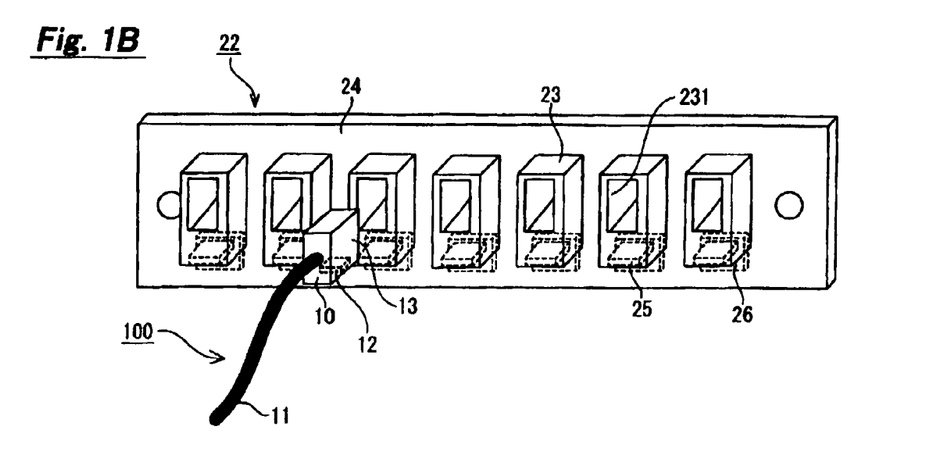

FIG. 1B is an enlarged illustration of the optical connector 10 and the adapter panel 22. The optical cable 100 has a Coil-on-Chip RFID 12 in addition to the optical connector 10 and the optical code 11.

The Coil-on-Chip RFID 12 is embedded in the end of a connector housing 13, which is a case of the optical connector 10. Specifically, the Coil-on-Chip RFID 12 is placed in such a way that the setting surface is substantially parallel to the side surface of the end portion of the connector housing 13. In FIG. 1B, the Coil-on-Chip RFID 12 is placed in the lower side surface of the end portion of the connector housing 13. Though the structure of the Coil-on-Chip RFID 12 is not specifically described here, the Coil-on-Chip RFID 12 has an antenna coil and a semiconductor chip including a memory. The memory stores various information. The antenna coil is integrally formed on the semiconductor chip.

The Coil-on-Chip RFID 12 may be embedded when molding the optical connector 10 during manufacturing. It is also possible to make a hollow at the top of the optical connector 10, insert the Coil-on-Chip RFID 12 into this hollow, and place a cover onto the hollow. It is also possible not to embed a bare chip of the Coil-on-Chip RFID 12 into a hollow portion of the optical connector 10 but to mold the Coil-on-Chip RFID 12 with resin and insert the mold into the hollow portion, thereby setting the position of the chip.

The size of the Coil-on-Chip RFID 12 can be small since the antenna coil is formed on the chip. This allows embedding the chip into the optical connector 10 of the optical cable 100 without changing the size or shape of a conventional connector. Further, since electromagnetic coupling occurs in a relatively small area in the Coil-on-Chip RFID 12, even if a plurality of adapters 23 of the circuit switching device 200 are arranged at a relatively close distance from each other and perform read/write operation at the same time, no signal interference or crosstalk occurs.

As shown in FIG. 1B, a plurality of adapters 23, an attachment 24, and a booster antenna 25 are placed in the adapter panel 22. In the adapter panel 22, the optical connector 10 of the optical cable 100 is inserted to each adapter 23.

The plurality of adapters 23 are fixed to the attachment 24. The attachment 24 mounts the adapters 23 to the adapter panel 22 so that adapters 23 are arranged on the adapter panel 22. The adapter 23 has an opening 231 for the optical connector 10 of the optical cable 100, though not shown in FIG. 1B.

The booster antenna 25 is a thin antenna, which is composed of a resonant circuit where a capacitor and a coil are connected, for example. The coil of the booster antenna 25 may be thinly formed on both sides of the substrate. The booster antenna 25 is placed in the lower part of the adapter 23. More specifically, the booster antenna 25 is fixed below the opening 231 of the adapter 23 for the optical connector 10.

Figure 2:
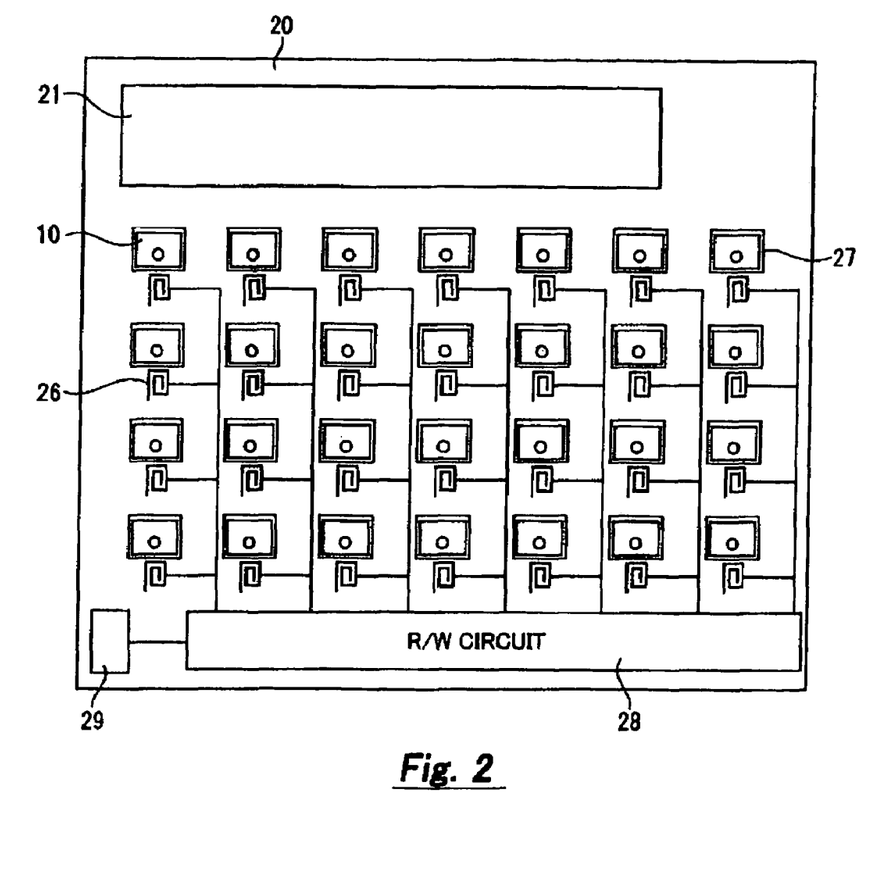
FIG. 2 is a plan view illustrating an example of the inner side surface in the cable connector identification system of this invention.

FIG. 2 illustrates an example of the side surface of the circuit switching device 200. This side surface is a backside of the surface of the main body panel 20 where the adapter panel 22 is mounted. This surface has a plurality of through holes 27, which are arranged in a matrix form. When the adapter panel 22 is mounted to the circuit switching device 200, each adapter 23 is fitted into the through hole 27. The adapters 23 are thereby arranged in a matrix form in the backside of the mounting surface. Of the adapters arranged in a matrix form, the adapters 23 arranged in one row are mounted to the main body panel 20 by the same attachment 24.

An R/W antenna 26 is placed along the inner side surface of the main body panel 20. Specifically, a plurality of R/W antennas 26 are placed between the through holes 27 arranged in a matrix form. Thus, each R/W antenna 26 is located between the adapters 23. In FIG. 2, they are located below each adapter 23.

Each R/W antennas 26 is placed in the position corresponding to the booster antenna 25. Specifically, the R/W antenna 26 is placed substantially perpendicular to the booster antenna 25. In other words, the booster antenna 25 is fixed substantially perpendicular to the side surface of the main body panel 20 where the adapters 23 are fitted.

All of the R/W antennas 26 are electrically connected to an R/W circuit 28, and the R/W circuit 28 is connected to a control device, not shown, via an interface connector 29. The control device scans each row of the R/W antennas 26, for example, via the R/W circuit 28 when reading information from the Coil-on-Chip RFID 12 of the connector housing 13.

Figure 3:
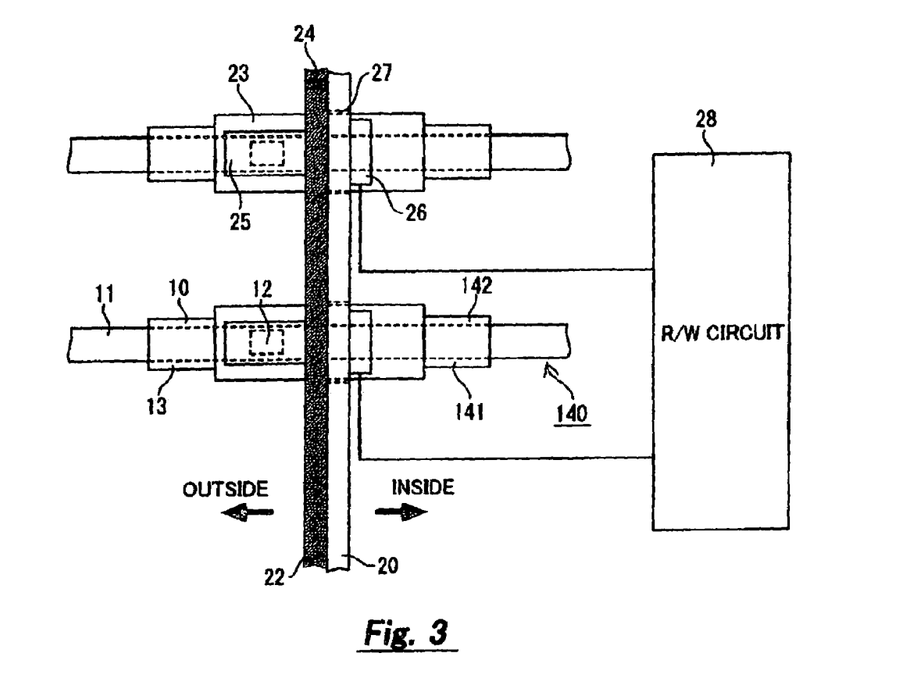
FIG. 3 is a bottom view illustrating an example of the connection structure of an optical cable in the cable connector identification system of this invention.
Figure 4:
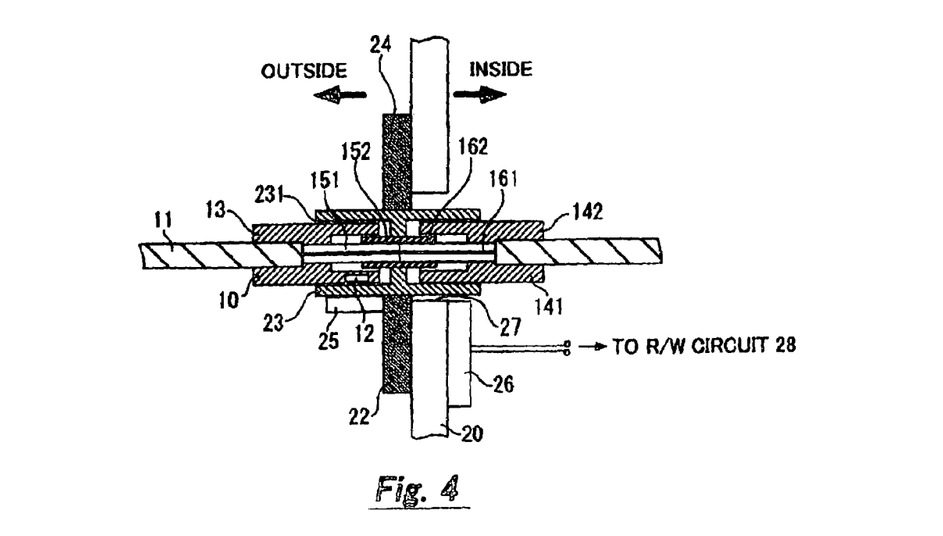
FIG. 4 is a cross-sectional view illustrating an example of the connection structure of an optical cable in the cable connector identification system of this invention.

FIGS. 3 and 4 show an example of the connection structure of the optical cable 100. FIG. 3 is a bottom view showing this connection structure, and FIG. 4 illustrates the cross-section of this structure. The bottom view and the cross-sectional view illustrate the optical connector 10 of the optical cable 100 at the operating side being inserted to the adapter 23.

As shown in FIG. 3, the attachment 24 is mounted to the outside or the operating side of the main body panel 20 of the circuit switching device 200. The adapters 23 are fixed in the central part of the attachment 24. Each adapter 23 is mounted by penetrating through the through hole 27 between the outside of the main body panel 20 and the inside or the equipment side where the R/W circuit 28 is placed of the main body panel 20. Thus, the adapter 23 is configured to allow insertion of the optical connector 10 of the optical cable 100 at the operating side, and an optical connector 141 of an optical cable 140 at the equipment side.

As shown in FIG. 4, when the optical connector 10 of the optical cable 100 is inserted into the adapter 23 at the operating side, a ferrule 151 projecting from the end of the connector housing 13 is inserted into a sleeve 152 in the adapter 23 projecting to the operating side. Similarly, when the optical connector 141 of the optical cable 140 is inserted into the adapter 23 projecting to the equipment side, a ferrule 161 projecting from the end of a connector housing 142 is inserted into a sleeve 162 at the equipment side in the adapter 23. In this state, the ferrules 151 and 161 are capable of optical communication at the center of the adapter 23.

The Coil-on-Chip RFID 12 is embedded in the lower side surface of the connector housing 13 at the operating side, and the booster antenna 25 is attached to the lower side surface of the adapter 23. When the connector housing 13 of the optical cable 100 is fitted into the adapter 23, the Coil-on-Chip RFID 12 comes close to the booster antenna 25. Specifically, when operating the equipment, the Coilon-Chip RFID 12 is located in the position facing the booster antenna 25. The Coil-on-Chip RFID 12 in the optical connector 10 thereby wirelessly communicates with the R/W antenna 26 via the booster antenna 25 of the adapter 23.

The positions of the Coil-on-Chip RFID 12 and the booster antenna 25 are set so that electromagnetic coupling occurs when the optical connector 10 and the adapter 23 are fitted to each other. If the booster antenna 25 electromagnetically couples to the Coil-on-Chip RFID 12, it receives data retained by the Coil-on-Chip RFID 12. The booster antenna 25 then sends the received data to the R/W antenna 26. The R/W antenna 26 thereby reads the data stored in the Coil-on-Chip RFID 12 embedded in the connector housing 13 of the optical connector 10 when the optical connector 10 is fitted into the adapter 23. Specifically, in this fitting state, the booster antenna 25 faces the Coil-on-Chip RFID 12 at a certain distance apart, and the R/W antenna 26 writes or reads information to or from a memory of the Coil-on-Chip RFID 12 via the booster antenna 25.

In the structure of FIG. 4, since the optical cable 100 is used with the optical connector 10 being inserted in the adapter 23, it is easy to accurately set the positions of the Coil-on-Chip RFID 12 and the booster antenna 25. Further, the structures of the optical connector 10 and the adapter panel 22 are simple and thus it costs low. Furthermore, this simple structure enhances the reliability of the equipment and allows easy repair in the event of breakage.

If the Coil-on-Chip RFID 12 are arranged close to each other, interference can occur between the adjacent Coil-on-Chip RFID 12. To avoid this, the size of the Coil-on-Chip RFID 12 is reduced to narrow the communication area. The decrease in the communication area makes it difficult for the Coil-on-Chip RFID 12 to suitably communicate with the R/W antenna 26 inside the circuit switching device 200. To overcome this disadvantage, the cable connector identification system of this embodiment places the booster antenna 25 between the Coil-on-Chip RFID 12 and the R/W antenna 26, thereby ensuring suitable wireless communication between the Coil-on-Chip RFID 12 and the R/W antenna 26.

Further, since the structure of FIG. 4 eliminates the need for a special structure for the adapter 23 and the attachment 24, it is possible to use a conventional adapter and attachment as they are. If needed, the adapter 23 may have a switch for detecting at real time the attachment or removal of the optical connector 10 at the operating side.

Figure 5A:
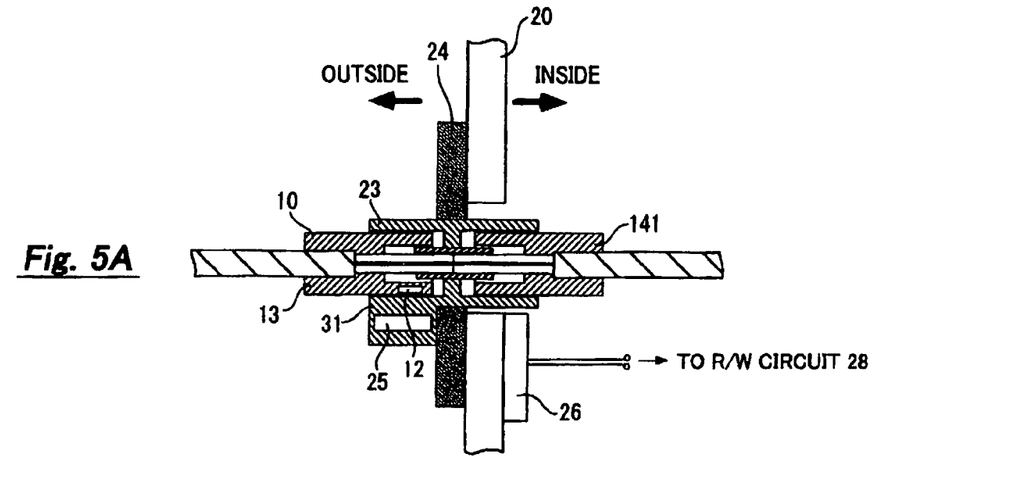
FIGS. 5A, 5B, and 5C are cross-sectional views illustrating examples of the connection structure of an optical cable in the cable connector identification system of this invention.
Figure 5B:
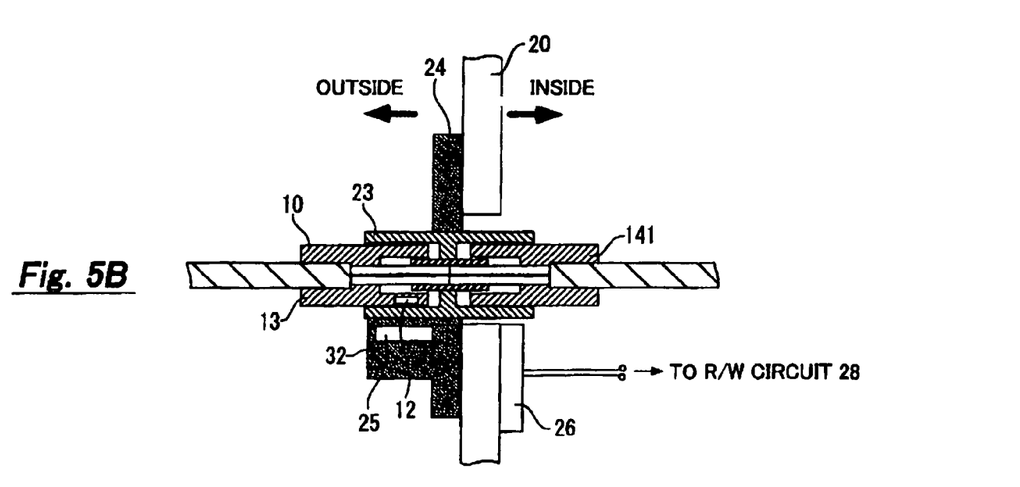
Figure 5C:
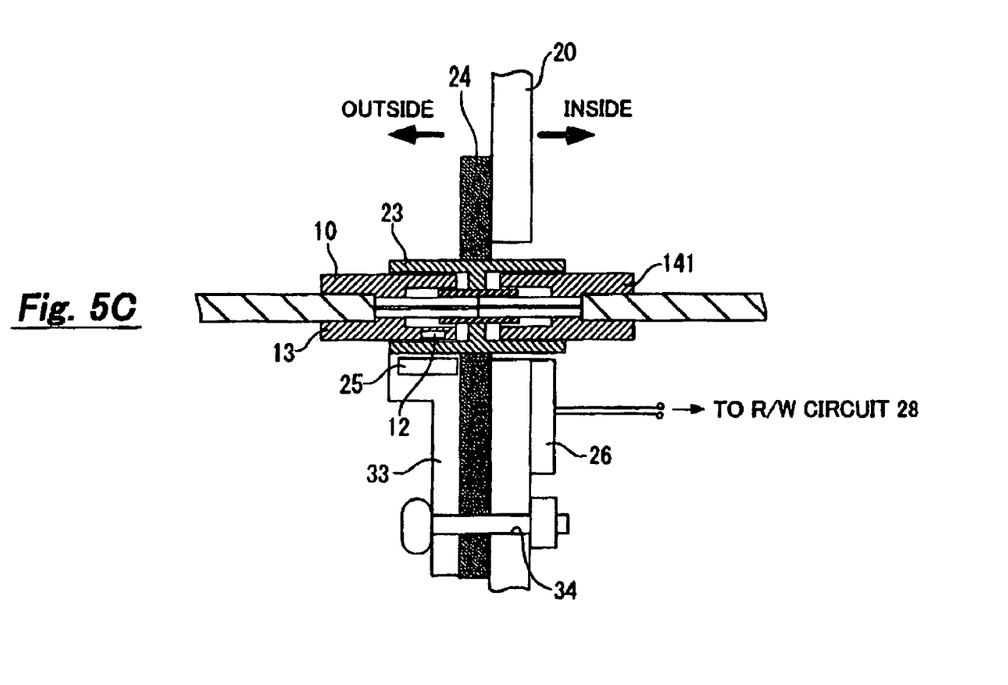

Referring then to FIGS. 5A to 5C, other aspects of the booster antenna 25 are described hereinafter.

FIG. 5A illustrates a second example of the connection structure of the optical cable 100. Though the booster antenna 25 is physically separated from the adapter 23 in the first example shown in FIG. 4, the booster antenna 25 is placed inside the adapter 23 in this second example. Specifically, the adapter 23 has a projecting portion 31 that projects substantially vertically downward below the inserting position of the connector housing 13. The booster antenna 25 is embedded in the projecting portion 31. Since the structure of FIG. 5A requires no special structure for the attachment 24, it is possible to use a conventional attachment as it is. This prevents an increase in the manufacturing cost of the adapter panel 22.

FIG. 5B illustrates a third example of the connection structure of the optical cable 100. Though the booster antenna 25 is placed inside the adapter 23 in the second example shown in FIG. 5A, it is placed inside the attachment 24 in this third example. Specifically, the attachment 24 has a projecting portion 32 that projects to the operating side below the mounting position of the adapter 23. The booster antenna 25 is embedded in the projecting portion 32. Since the structure of FIG. 5B requires no special structure for the adapter 23, it is possible to use a conventional adapter as it is. This prevents an increase in the manufacturing cost of the adapter panel 22.

FIG. 5C illustrates a fourth example of the connection structure of the optical cable 100. This example places an antenna unit 33 containing the booster antenna 25 separately from the adapter 23 and the attachment 24. The antenna unit 33 has an L-shaped cross-section. The booster antenna 25 is embedded in the antenna unit 33 near the surface to contact with the adapter 23. The antenna unit 33 is mounted by a bolt and nut penetrating through a mounting hole 34 formed in the attachment 24 and the main body panel 20, for example. The structure of FIG. 5C allows system architecture without a significant change of the conventional structure.

In the structures of FIGS. 5A, 5B and 5C, the attachment 24 may have a switch for detecting at real time the attachment or removal of the optical connector 10 at the operating side as needed.

Second Embodiment

Figure 6:
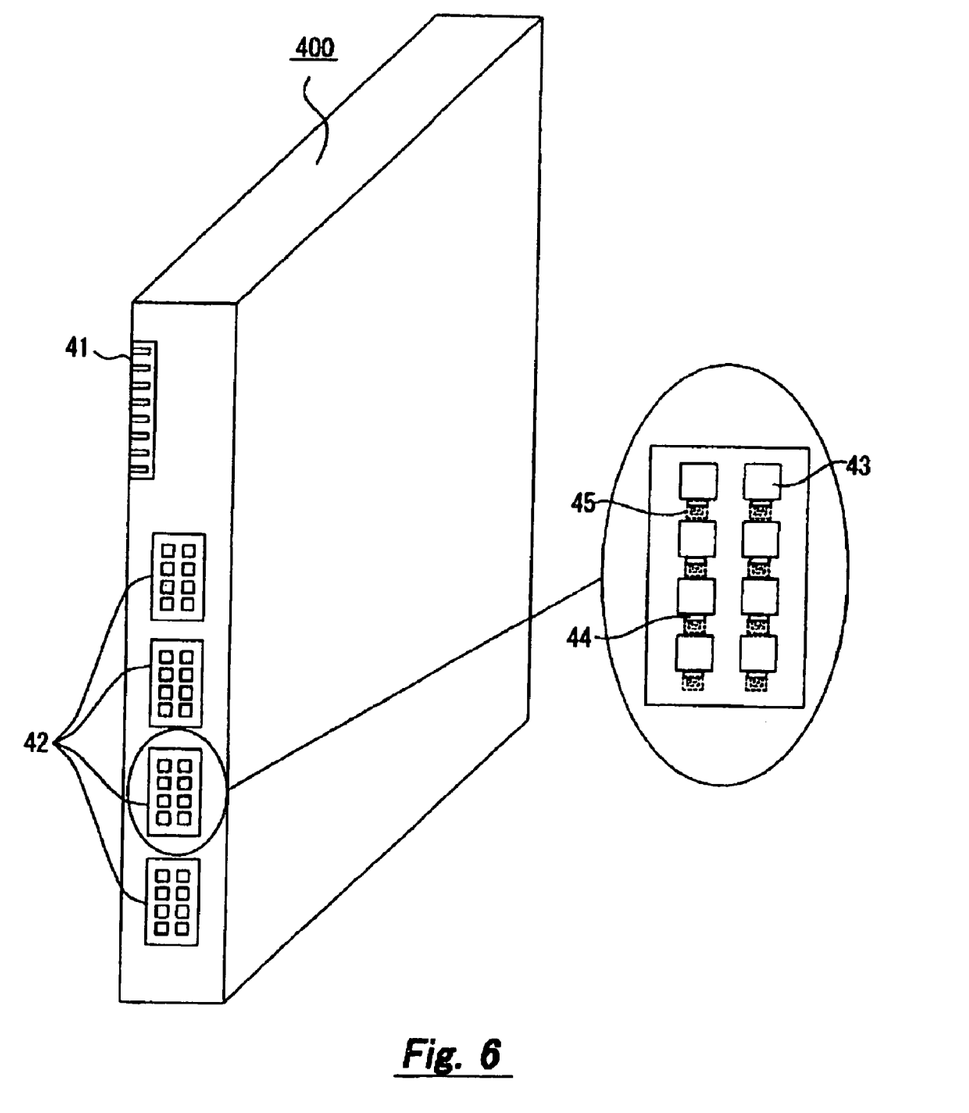
FIG. 6 is a view illustrating a structural example of the cable connector identification system of this invention.

A second embodiment of the invention applies the cable connector identification system to a telephone switching device, just like the first embodiment. FIG. 6 is a perspective view of a telephone switching device. The telephone switching device can be used by connecting an optical cable to the telephone switching device as in the first embodiment.

As shown in FIG. 6, one side surface of the telephone switching device 400 has a display section 41 and a plurality of adapter panels 42. A plurality of adapters 43 and booster antennas 44 are placed in each adapter panel 42. Further, a plurality of R/W antennas 45 are placed in the internal surface of the telephone switching device 400 where the adapter panels 42 are mounted.

A connector of a cable for telephone line connection, not shown, is inserted to each adapter 43 in the same way as the optical connector 10 and they are electrically connected inside the adapter 43. Further, the Coil-on-Chip RFID 12 is placed in the connector of the cable. The structures of the cable and the connector are not described here since they are the same as those described in the first embodiment.

The telephone switching device 400 of the second embodiment is unique in the internal processing.

The Coil-on-Chip RFID 12 stores a cable ID that is identification information specific to each cable. The cable ID may be different for each cable type or different for each cable. The R/W antenna 45 reads the cable ID in the telephone switching device 400 and compares the cable ID with a registration ID that is identification information previously stored in a memory. This allows checking if a cable is properly installed or not. The R/W antenna 45 reads the cable ID from the Coil-on-Chip RFID 12 via the booster antenna 44.

Figure 7:
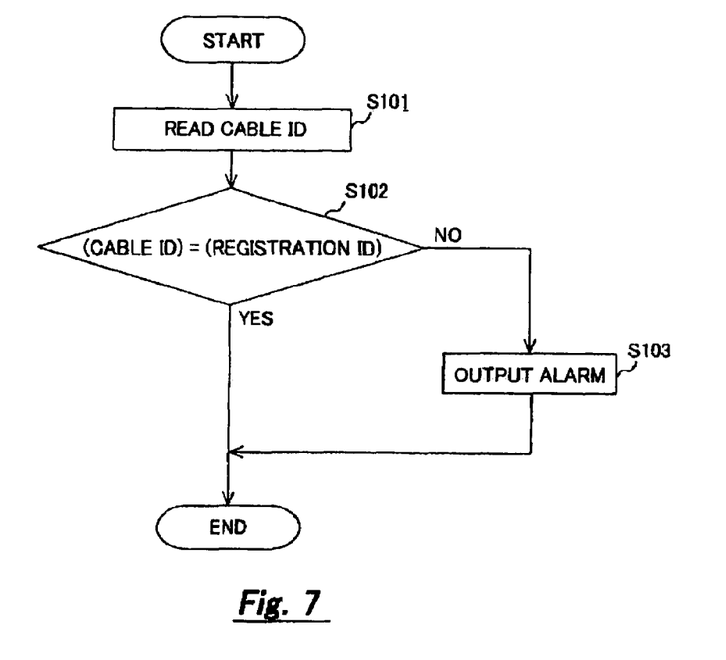
FIG. 7 is a flowchart showing an example of the processing flow in the cable connector identification system of this invention.
Figure 8:
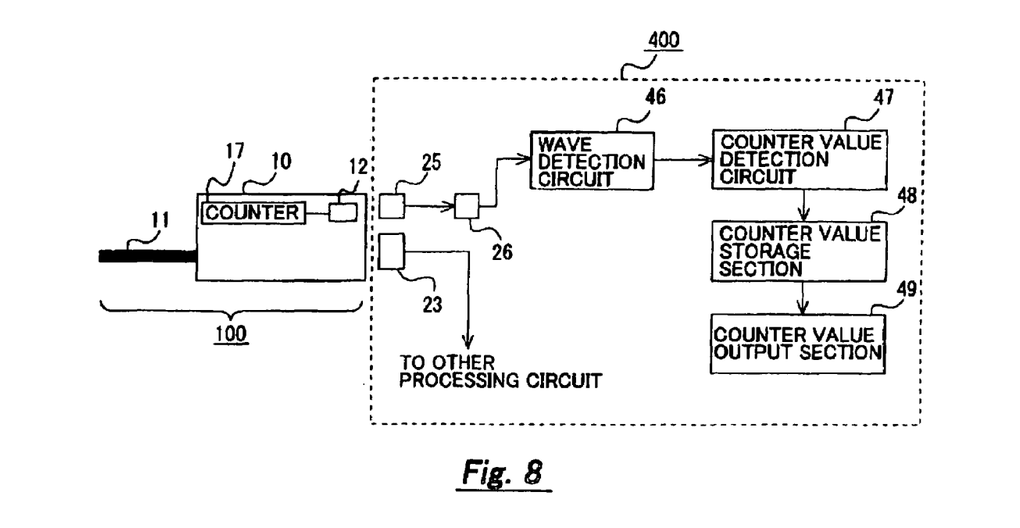
FIG. 8 is a block diagram illustrating a structural example of the cable connector identification system of this invention.

Referring to the flowchart of FIG. 7, the comparison process is described below. As shown in FIG. 7, the process first reads the cable ID stored in the Coil-on-Chip RFID 12 (S101). Specifically, an antenna coil integrally formed with the Coil-on-Chip RFID 12 transmits a radio signal about the cable ID. The R/W antenna 45 of the telephone switching device 400 receives the radio signal via the booster antenna 44, and a processing circuit extracts the cable ID.

Then, the process compares the extracted cable ID with the stored registration ID (S102). If the two IDs match, no processing is conducted. In order to inform a user of this matching, the result may be output with a sound or an image.

On the other hand, if the cable ID and the registration ID do not match, an alarm is output with a sound or image (S103).

This embodiment requires a simple speaker or a display to output the alarm. It is possible to connect lines only if the cable ID and the registration ID match.

Third Embodiment

A third embodiment of the invention applies the cable connector identification system to a telephone switching device, just like the second embodiment. The configuration of the telephone switching device is the same as described in FIG. 6. The telephone switching device 400 of the third embodiment is unique in the internal processing just like the second embodiment.

The cable connector identification system of the third embodiment is used by connecting the optical cable 100 to the telephone switching device 400 as in the first embodiment. In the optical cable 100 connected to the switching device 400, the core alignment accuracy to align the optical axis is so important as to greatly affect the communication performance. However, it is inevitable that the core alignment accuracy deteriorates by repeating the insertion and removal of the optical cable 100 into and from the telephone switching device 400. Thus, it is necessary to replace the optical cable 100 every after 50 to 1000 times of the insertion/removal operations, depending on the specification or the like of the optical cable 100. The third embodiment counts the number of times of inserting/removing the optical cable 100 by using the Coil-on-Chip RFID 12 placed in the optical connector 10 of the optical cable 100.

Figure 9:
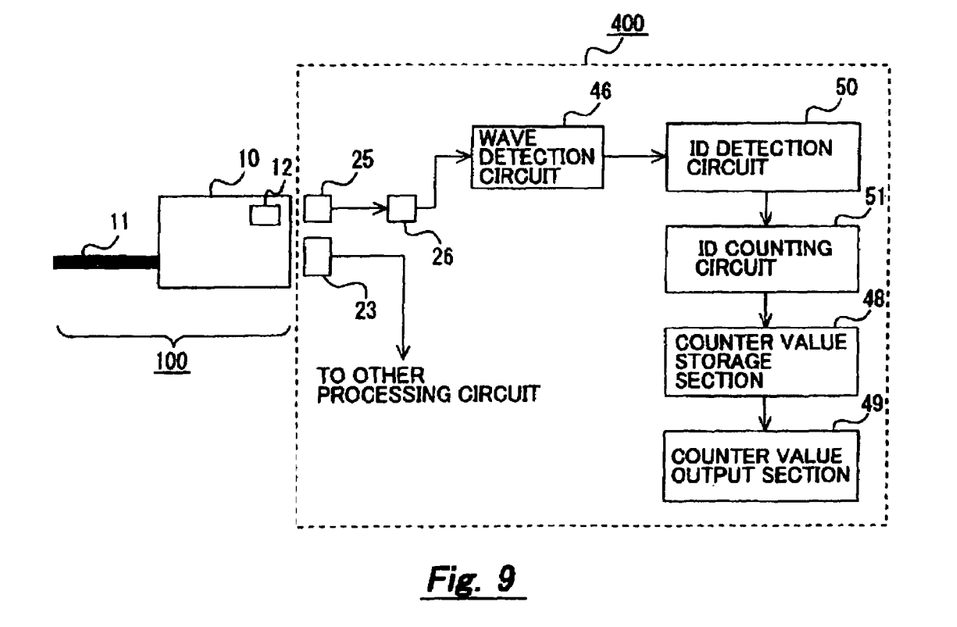
FIG. 9 is a block diagram illustrating a structural example of the cable connector identification system of this invention.

FIG. 9 illustrates an example of the configuration of the cable connector identification system according to the third embodiment of the invention. In this example, a counter 17 is placed in the optical connector 10 of the optical cable 100. The counter 17 is connected to the Coil-on-Chip RFID 12. The Coil-on-Chip RFID 12 detects that the optical cable 100 is connected to the adapter 43 of the telephone switching device 400 and inputs the detection signal to the counter 17.

The counter 17 increases a count value one by one based on the detection signal, thereby counting the number of insertion/removal times of the optical cable 10. Further, the counter 17 may output count value data to the Coil-on-Chip RFID 12. The Coil-on-Chip RFID 12 may output a radio signal about the count value data to the telephone switching device 400 by the booster antenna 44 and the R/W antenna 45. The counter 17 may be formed in the internal circuit of the Coil-on-Chip RFID 12.

On the other hand, the telephone switching device 400 has a wave detection circuit 46, a counter value detection circuit 47, a counter value storage section 48, and a counter value output section 49 in addition to the adapter 43, the booster antenna 44, and the R/W antenna 45. The R/W antenna 45 receives the radio signal about the count value data output from the Coil-on-Chip RFID 12 via the booster antenna 44 and outputs the signal to the wave detection circuit 46. The wave detection circuit 46 detects the radio signal and outputs it to the counter value detection circuit 47.

The counter value detection circuit 47 detects the counter value data from the input signal and stores it in the counter value storage section 48. The counter value data stored in the counter value storage section 48 is read out as needed and output by the counter value output section 49 such as a display so as to inform a user of the result. For example, the count value is shown on the display. On the other hand, the optical cable 100 receives an optical signal from the optical connector 10 and outputs it to another processing circuit, which is not shown.

As described above, the cable connector identification system of the third embodiment allows counting the connection times of the optical cable 100 with a simple configuration. Especially, since the counter 17 is placed in the optical cable 100, even if the optical cable 100 is inserted to and removed from another telephone switching device 400 as well, it is possible to accurately count the connection times. Further, since the optical connector 10 of the optical cable 100 has the Coil-on-Chip RFID 12 for use, it is possible to configure the optical connector 10 without increasing its size.

Fourth Embodiment

A fourth embodiment of the invention applies the cable connector identification system to a telephone switching device, just like the third embodiment. The structure of the telephone switching device is the same as described in FIG. 6. This embodiment also connects an optical cable to the telephone switching device 400.

The fourth embodiment is the same as the third embodiment in counting the number of insertion/removal times of the optical cable 100 by using the Coil-on-Chip RFID 12 placed in the optical connector 10 of the optical cable 100. This embodiment, however, is different from the third embodiment in having the counting function in the telephone switching device 400.

FIG. 9 illustrates an example of the configuration of the cable connector identification system according to the fourth embodiment. The optical connector 10 of the optical cable 100 has the Coil-on-Chip RFID 12. The Coil-on-Chip RFID 12 stores a cable ID that is identification information specific to each optical cable 100.

On the other hand, the telephone switching device 400 has the wave detection circuit 46, an ID detection circuit 50, an ID counting circuit 51, the counter value storage section 48, and the counter value output section 49 in addition to the adapter 43, the booster antenna 44, and the R/W antenna 45. The telephone switching device 400 of this embodiment replaces the counter value detection circuit 47 of the third embodiment with the ID detection circuit 50 and the ID counting circuit 51.

The R/W antenna 45 receives a radio signal about the cable ID output from the Coil-on-Chip RFID 12 via the booster antenna 44 and outputs the signal to the wave detection circuit 46. The wave detection circuit 46 detects the radio signal and outputs it to the ID detection circuit 50. The ID detection circuit 50 detects the cable ID from the input signal and outputs the detection signal to the ID counting circuit 51. The ID counting circuit 51 increases a count value one by one based on the detection signal, thereby counting the number of times of inserting/removing the optical cable 100.

The ID counting circuit 51 outputs the count value data to the counter value storage section 48 and stores it in the counter value storage section 48. The counter value data stored in the counter value storage section 48 is read out as needed and output by the counter value output section 49 such as a display so as to inform a user of the result. For example, the count value is shown on the display. On the other hand, the optical cable 100 receives an optical signal from the optical connector 10 and outputs it to another processing circuit, which is not shown.

As described above, the cable connector identification system of the fourth embodiment allows counting the connection times of the optical cable 100 with a simple configuration. Further, since the optical connector 10 of the optical cable 100 has the Coil-on-Chip RFID 12 for use, it is possible to configure the optical connector 10 without increasing its size.

Fifth Embodiment

Figure 10:
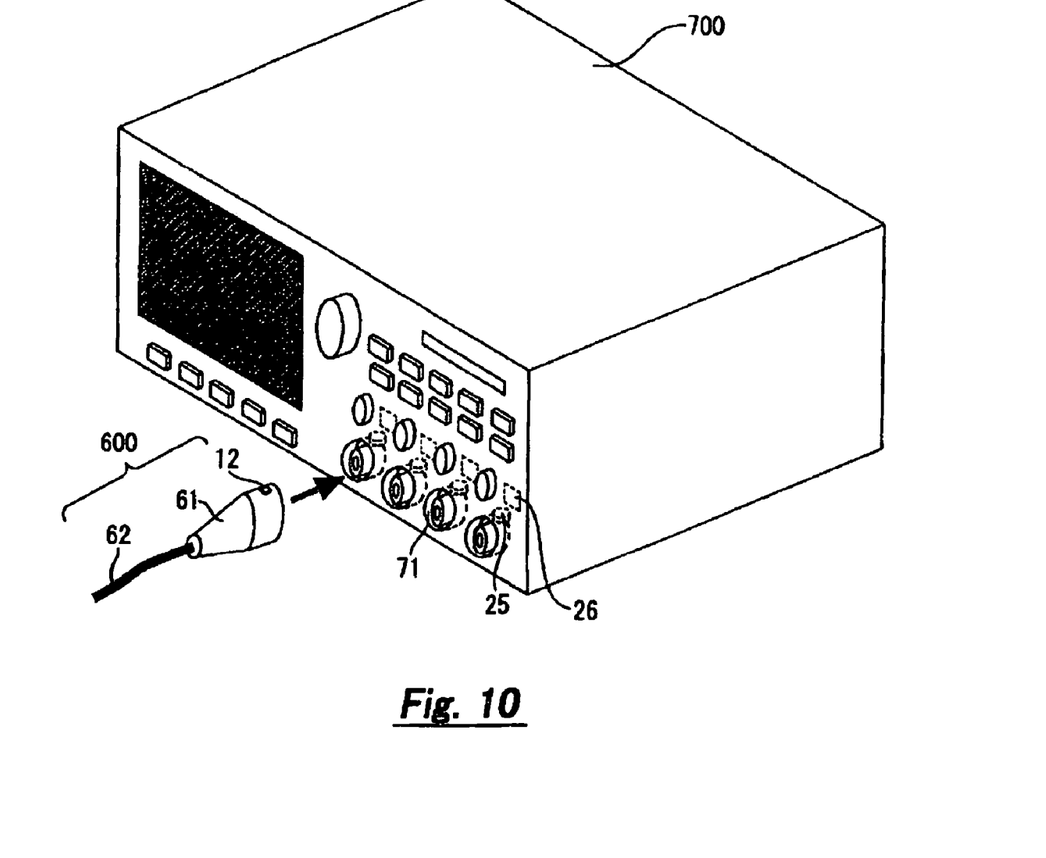
FIG. 10 is a view illustrating a structural example of the cable connector identification system of this invention.

A fifth embodiment applies the cable connector identification system to an oscilloscope. The cable connector identification system is composed of a cable 600 and an oscilloscope 700. FIG. 10 illustrates the entire structure of the cable 600 and the oscilloscope 700.

As shown in FIG. 10, the cable 600 is composed of a connector 61, the Coil-on-Chip RFID 12, and a probe 62. The oscilloscope 700 includes an adapter 71, the booster antenna 25, and the R/W antenna 26.

Figure 11:
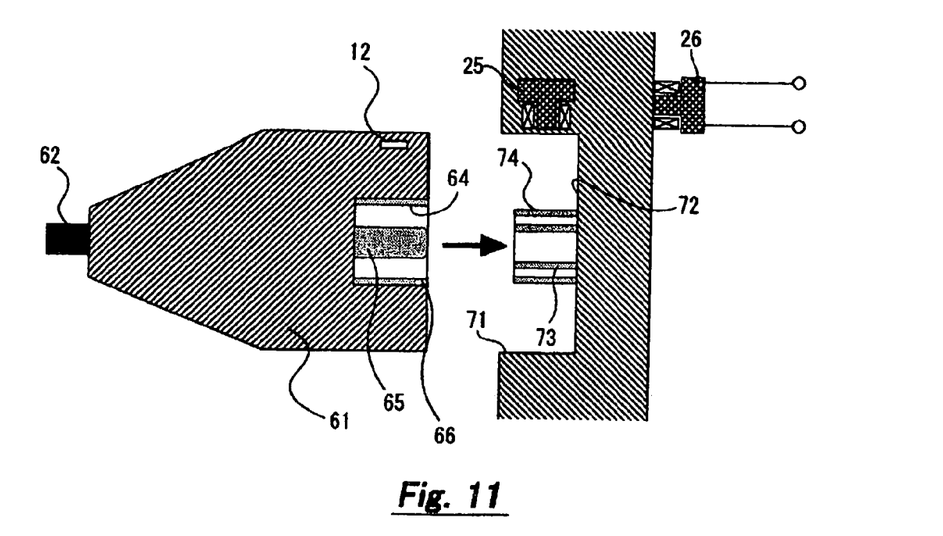
FIG. 11 is a cross-sectional view illustrating an example of the connection structure of a connector in the cable connector identification system of this invention.

FIG. 11 illustrates the cross-section before connecting the connector 61 and the adapter 71.

The connector 61 has the same structure as the optical connector 10 and the Coil-on-Chip RFID 12 is embedded in its end. The Coil-on-Chip RFID 12 is embedded in the upper side surface of a connector housing 63, which is different from the optical connector 10.

The central part at the end of the connector 61 has a hollow 64. A signal line terminal 65 is placed in the central part of the hollow 64. Further, a GND terminal 66 is placed along the entire peripheral wall of the hollow 64. It is also possible not to embed a bare chip of the Coil-on-Chip RFID 12 in the hollow 64 but to mold the Coil-on-Chip RFID 12 with resin and insert the mold into the hollow 64, thereby setting the position of the chip.

The adapter 71 has a female jack shape. The adapter 71 fits with the connector 61 of the cable 600 and they are electrically connected inside. Specifically, the adapter 71 has a columnar signal line terminal 73 and a GND terminal 74 as shown in FIG. 11. The signal line terminal 73 is configured so that the outer surface of the signal line terminal 65 is electrically connected to the inner surface of the signal line terminal 73 when the signal line terminal 65 of the connector 61 is inserted into the signal line terminal 73. The GND terminal 74 is configured so that the inner surface of the GND terminal 66 of the connector 61 is electrically connected to the outer surface of the GND terminal 74.

The booster antenna 25 is located in the position facing the Coil-on-Chip RFID 12 when the connector 61 is fitted to the adapter 71. Specifically, the female adapter 71 has a hollow 72, and the booster antenna 25 is placed in the internal side surface above the hollow 72. Further, the booster antenna 25 of the oscilloscope 700 is placed substantially perpendicular to the R/W antenna 26. The R/W antenna 26 is connected to the R/W circuit 28.

Figure 12:
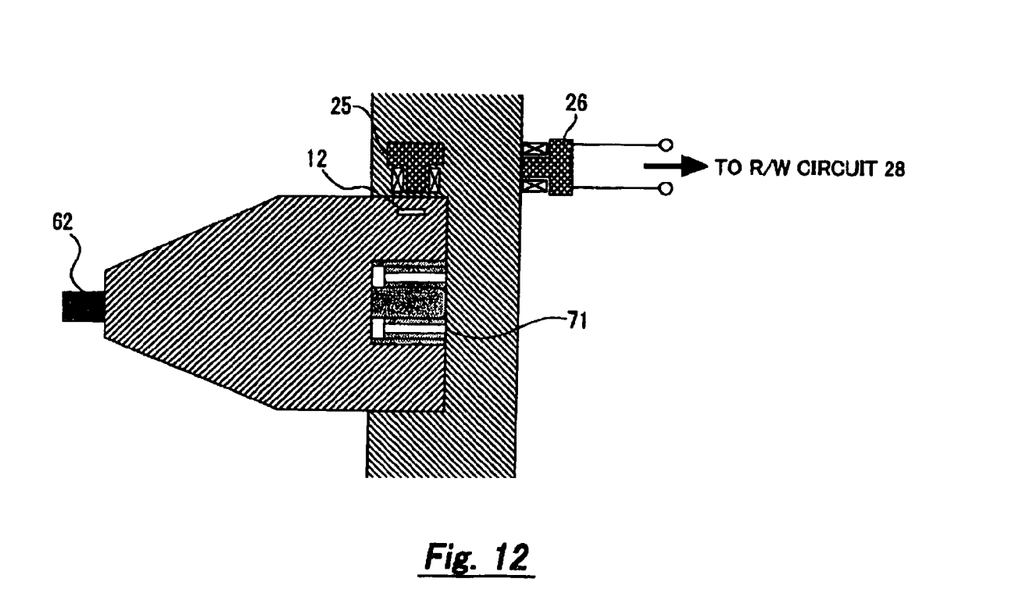
FIG. 12 is a cross-sectional view illustrating an example of the connection structure of a connector in the cable connector identification system of this invention.

FIG. 12 illustrates the cross-section of the connector 61 and the adapter 71 when fitted together. The positions of the Coil-on-Chip RFID 12 and the booster antenna 25 are set so that they are electromagnetically coupled to each other when fitted together. When the electromagnetic coupling is made, the booster antenna 25 receives the data retained by the Coil-on-Chip RFID 12. The booster antenna 25 then sends the received data to the R/W antenna 26.

In the application to the oscilloscope 700 as well, it is easy to attain a high positioning accuracy between the Coil-on-Chip RFID 12 and the booster antenna 25. Further, the simple structure allows lowering manufacturing costs and enhancing the reliability of the equipment. Furthermore, since the oscilloscope 700 requires no special structure for the adapter 23, it is possible to use a conventional adapter as it is.

Other Embodiments

Though the above embodiments use a Coil-on-Chip as an example of a wireless IC tag to allow contactless communication between a cable and electrical equipment, it is possible to exchange information by contact communication.

Further, though the above embodiments show the case of applying this invention to the oscilloscope and the telephone switching device, it is not limited thereto, and this invention may be applied to any electrical equipment to which a cable connector is connected. For example, this invention is applicable to various electrical equipment including relay devices such as a router and hub, audio equipment, video-cassette recorders, computer equipment, and so on.

Furthermore, in the case of inserting a plug of a power code into an electrical outlet, an IC device such as a Coil-on-Chip may be embedded in the plug portion. In this case, it is possible to control the insertion state of the electrical code by storing identification information in the IC device and placing in the electrical outlet an antenna and a processing circuit for reading the identification information from the IC device, for example. It is also possible to detect which electrical code is kept inserted for how long or detect the removal of the electrical code in the electrical equipment requiring constant power supply from an electrical outlet through an electrical code, for example.

In addition, this invention allows the place that offers network connection service such as internet using a communication cable to control the connection service offering time period by storing identification information in an IC device such as a Coil-on-Chip placed in a connector of the communication cable, placing an antenna in the inserting position of the communication cable located in this place, and reading the identification information by the antenna. With the control of the service offering time period, it is possible to charge a user for a fee according to the time period during which service is offered.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An adapter panel having an adapter where a connector including a wireless IC tag in a side surface is inserted or removed, the adapter panel comprising:
   a booster antenna placed in a position facing the wireless IC tag of the adapter when the connector is inserted to the adapter; and
   an equipment antenna placed in a surface of the adapter panel which is a reverse side of the surface where the connector is inserted or removed in a position corresponding to the booster antenna.

2. The adapter panel of claim 1, wherein the booster antenna is placed substantially perpendicular to the equipment antenna.

3. The adapter panel of claim 1, wherein
   the adapter panel has a first surface where the connector is inserted or removed, and a second surface which is a reverse side of the first surface, the adapter is placed in the first surface, and the equipment antenna is placed in the second surface.

4. The adapter panel of claim 1, further comprising an attachment to which the adapter is attached and which mounts the adapter to the adapter panel, wherein the attachment sets a position of the adapter.

5. An adapter panel having a plurality of adapters where a connector including a wireless IC tag in a side surface is inserted or removed and including a first surface where the connector is inserted or removed and a second surface which is a reverse side of the first surface, the adapter panel comprising:
- a booster antenna placed in a side surface of the adapter in a position facing the wireless IC tag when the connector is inserted to the adapter; and
- an equipment antenna placed in the second surface of the adapter panel in a position corresponding to the booster antenna.

6. An electronic equipment comprising:
- an adapter panel having in an outer side an adapter where a connector including a wireless IC tag in a side surface is inserted or removed;
- a booster antenna placed in a position facing the wireless IC tag when the connector is inserted to the adapter; and
- an equipment antenna placed inside the electronic equipment,
- wherein the booster antenna relays wireless communication between the wireless ID tag and the equipment antenna.

7. A cable connector identification system comprising:
- a cable having a connector;
- equipment connected to the cable via the connector; and
- the adapter panel according to claim 1.

8. The cable connector identification system of claim 7, wherein a plurality of adapters are arranged on the adapter panel in a matrix form.

9. The cable connector identification system of claim 7, wherein the cable is an optical fiber cable.

* * * * *